(12) United States Patent
Zhang et al.

(10) Patent No.: US 6,457,082 B1
(45) Date of Patent: Sep. 24, 2002

(54) BREAK EVENT GENERATION DURING TRANSITIONS BETWEEN MODES OF OPERATION IN A COMPUTER SYSTEM

(75) Inventors: Xinmin Zhang; Lan Wang; Paul Poh Loh Cheok, all of Singapore (SG)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/281,366

(22) Filed: Mar. 30, 1999

(30) Foreign Application Priority Data

Dec. 28, 1998 (SG) ............................................. 9804835

(51) Int. Cl.$^7$ ............................................. G06F 13/00
(52) U.S. Cl. ........................ 710/260; 710/261; 710/266
(58) Field of Search ............................... 710/266, 260, 710/261, 262, 263, 264, 265, 267, 268, 269

(56) References Cited

U.S. PATENT DOCUMENTS 5,922,075 A * 7/1999 Bowker ...................... 713/300
6,272,642 B2 * 8/2001 Pole, II et al. ............... 713/300

OTHER PUBLICATIONS

Intel Pentium® II Processor Mobile Module: Mobile Module Connector 2 (MMC–2), Aug. 1998.
82371Ab PCI–to–ISA / Ide Xcelerator (PIIX4), Intel, Apr. 1997.
Intel®82371AB (PIIX4), Specification Update, Intel, Oct. 1998.
Intel®82371EB (PIIX4E), Specification Update, Intel, Oct. 1998.

* cited by examiner

Primary Examiner—Peter Wong
Assistant Examiner—Tim Vo
(74) Attorney, Agent, or Firm—Conley, Rose & Tayon, P.C.; Jonathan M. Harris

(57) ABSTRACT

A break event in a computer system that can operate in one of a plurality of modes, such as a high performance mode and a low power mode is initiated only be logic that that detects when the transition between modes is complete. In the high performance mode, the CPU clock is faster than in the low power mode. The CPU voltage may also be higher in the high performance mode than in the low speed mode. The low power mode may be desirable for a portable computer operating from battery power in order to conserve the battery's charge. The computer system preferably transitions its CPU to a "sleep" state during the mode switch and precludes devices not associated with the mode transition from "waking" the CPU and disturbing the completion of the mode switch. Accordingly, only logic that detects the end of the mode switch can break the CPU out of its sleep state.

21 Claims, 4 Drawing Sheets

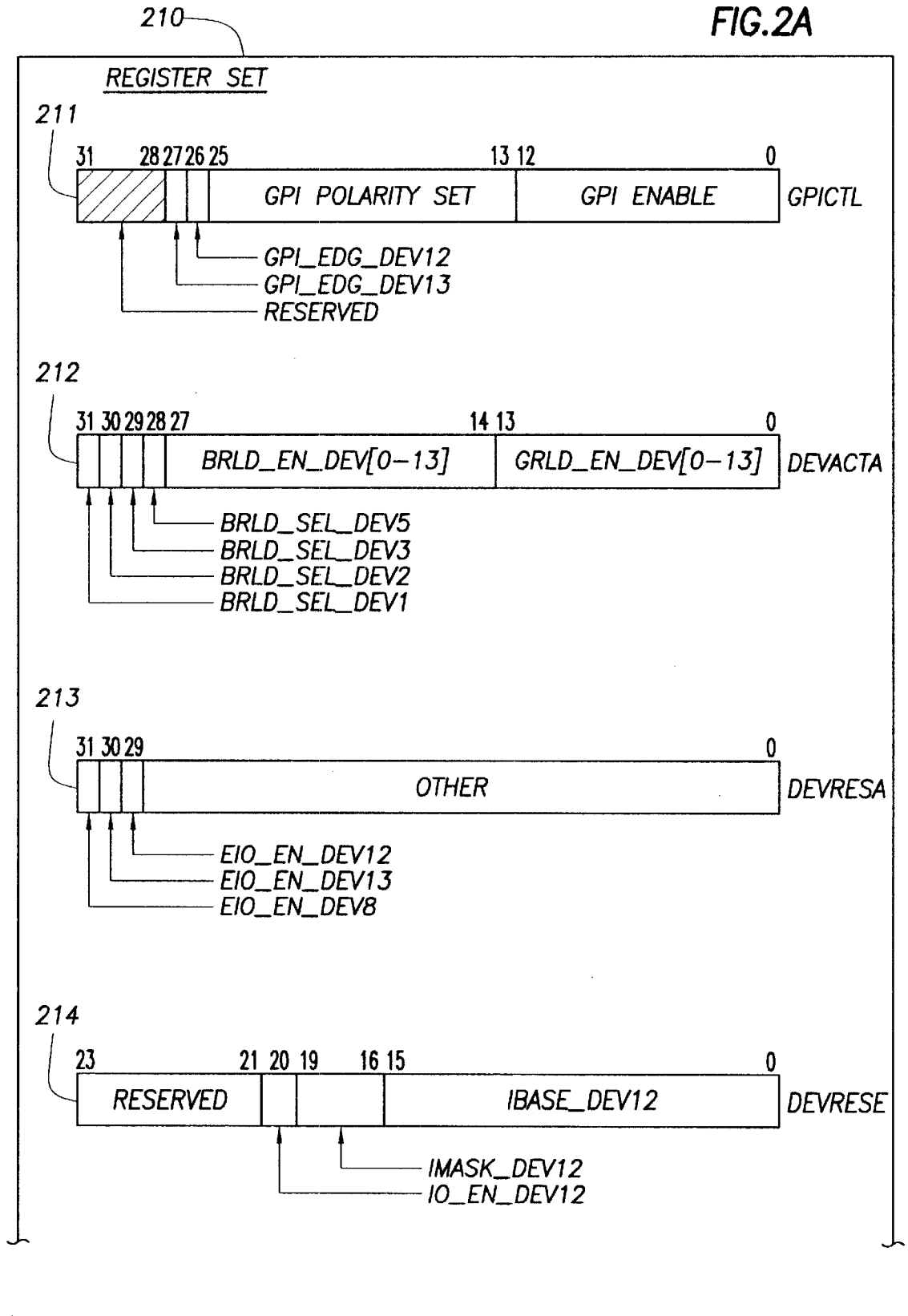

BREAK EVENT GENERATION DURING TRANSITIONS BETWEEN MODES OF OPERATION IN A COMPUTER SYSTEM

CROSS-REFERENCE TO RELATED APPLICATIONS

This application claims priority of Singapore Application No. 9804835-8 filed Dec. 28, 1998.

STATEMENT REGARDING FEDERALLY SPONSORED RESEARCH OR DEVELOPMENT

Not applicable.

BACKGROUND OF THE INVENTION

1. Field of the Invention

The present invention generally relates to transitioning a computer system between modes of operation. More particularly, the invention relates to transitioning a portable computer between high performance and low power modes of operation. Still more particularly, the invention relates to generating a break event to alert the computer system's power management logic that the transition between modes of operation has completed.

2. Background of the Invention

Computer systems require electrical power to operate. Portable computers ("laptops") can operate either from alternating current ("AC") power from a wall plug or direct current ("DC") power from a battery. Because batteries only hold enough energy for the computer to operate for a finite period of time, it is desirable to make the batteries last as long as possible. Increasing the time in which a battery can provide usable power can be accomplished either by providing a higher density battery (i.e., a battery that provides more energy per unit volume) or designing the computer system to require less power to operate.

Desktop personal computers generally operate only from AC power. Even though such computers generally do not operate off of battery power, it nevertheless is desirable to provide a desktop system that consumes as little electrical power as possible. Reducing the electrical power demands of computers, and other electrical equipment, helps to alleviate the environmental concerns caused by electrical power plants.

One technique for reducing the power demand of a computer is to lower the frequency of the central processing unit ("CPU") clock signal. The CPU clock signal is a periodic signal which oscillates between two voltages at a specified rate and controls the internal timing of the CPU. That rate is referred to as the "frequency" or "speed" of the clock signal. A 400 MHz CPU clock, for example, oscillates between two voltage levels at a rate of 400 million times per second. CPUs generally consume less power when operated using clock signals at lower speeds. A CPU operating from a 300 MHz clock signal generally consumes less power then the same CPU operating at 400 MHz. Additionally and/or alternatively, computer system power consumption can be reduced by having the electrical devices that comprise the computer operate a lower voltage. All else being equal, a 5V processor consumes more power than a 3.3V processor.

Accordingly, one way to conserve power in a computer system is for the computer to transition from a higher power mode of operation to a lower power mode of operation in certain, pre-defined situations. The situations may include disconnecting the AC power cord from a portable computer, thereby requiring the computer to operate from a battery. Performance is increased while the computer operates off AC power by running the CPU at its maximum rated speed. While operating off battery power, the battery charge is conserved by running the CPU at a slower speed and/or operating the CPU at a lower voltage. If the portable computer includes a fan to help cool the electronics, the fan may be turned off to further conserve battery power. Without the fan helping to cool the computer, the electronics may become warmer than desirable. Reducing the CPU voltage ameliorates this problem. Of course, once the AC power is restored, the computer should transition back to the higher power mode of operation.

The Intel Corp. as suggested an initiative called "Geyserville Technology" which permits a computer to transition between various power modes of operation. Intel chip sets (e.g. processors and bridge devices) that implement Geyserville technology include logic that initiates transitions between power modes of operation. In a "high performance" mode, the CPU operates at full speed and a higher voltage than when operating in a "low power" mode in which the speed of the CPU clock signal and operational voltage are reduced. Transitioning a computer between operational modes in accordance with the Geyserville Technology is often referred to as a "Geyserville mode switch." Descriptions of Intel chip sets that implement the Geyserville technology include "Intel Pentium® II Processor Mobile Module: Mobile Module Connector 2 (MMC-2)" dated August 1998 and the "82371AB PCI-to-ISA/IDE XCEL-ERATOR (PIIX4)" dated April 1997, both of which are incorporated herein by reference.

It has been observed that in certain situations a computer that implements the standard Geyserville mode switching logic may cause various problems preventing the computer from operating normally. These problems occur in situations in which the computer is in the process of transitioning from one mode of operation to another mode when the CPU is requested to perform another function. For example, a Geyserville interrupting event may undesirably experience latency and retries may be required prolonging the Geyserville mode switch.

One solution to this problem is for the user to not use the computer in such a way as may disturb the CPU during the Geyserville mode switch. This approach places an undesirable burden on the human user to remember not to press a key or other input device during a Geyserville mode switch. Further, in some situations, such as when the computer's modem receives an incoming communication over a telephone line during a Geyserville mode switch, the computer's hardware resources, not the human user, causes the disturbance to the CPU during the mode switch. It would be better, however, to provide a computer system in which the CPU cannot be disturbed during the mode switch without the problems of conventional systems. Despite the advantages such a computer system would offer, to date no such system is known to exist.

BRIEF SUMMARY OF THE INVENTION

The deficiencies of the prior art described above are solved in large part by a computer system that can operate in one of a plurality of modes, such as a high performance mode and a low power mode. In the high performance mode, the CPU clock is faster than in the low power mode. The CPU voltage may also be higher in the high performance mode than in the low power mode. The low power mode may be desirable for a portable computer operating from battery power in order to conserve the battery's charge. The computer system preferably transitions the CPU to a "sleep" state during the mode switch and, in accordance with the preferred embodiment, precludes devices not associated with the mode transition from "waking" the CPU before the mode switch has completed. Accordingly, only logic that detects the end of the mode switch can break the computer out of the sleep state. Further, completion of the mode switch is not slowed down by non-mode switch related events.

The computer system preferably includes a CPU mobile module coupled to a bus bridge device, stop clock logic and a clock generator. The bus bridge device includes registers that can be programmed by the CPU mobile module to enable a break event that preferably can only be initiated by the CPU mobile module upon completion of a mode switch. Once the mode switch is complete, the CPU mobile module asserts a general purpose input signal to the bus bridge device to initiate a break event. The particular general purpose input signal used to initiate the break event preferably is not shared by devices other than the CPU mobile module and thus, only the CPU mobile module can initiate the break event.

By enabling and generating a break event that is not shared by devices other than the CPU mobile module, the problems described above regarding conventional computer systems are mitigated or avoided altogether. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiments is considered in conjunction with the following drawings, in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
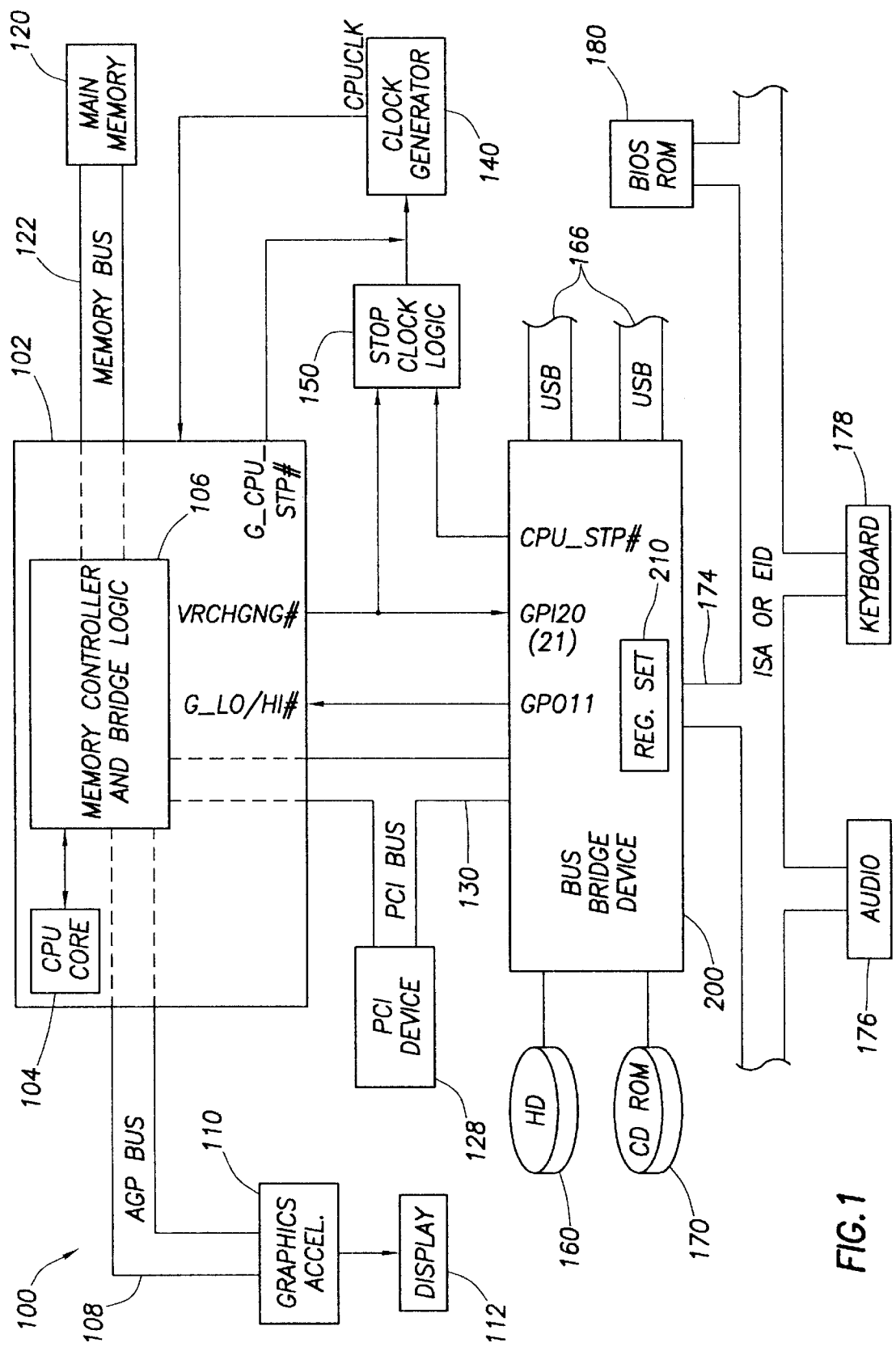
FIG. 1 is a block diagram of a computer system constructed in accordance with the preferred embodiment.

Referring now to FIG. 1, computer system 100 constructed in accordance with the preferred embodiment generally includes a CPU mobile module 102, graphics accelerator 110, display 112, main memory 120, clock generator 140, stop clock logic 150, and bus bridge device 200. Computer system 100 may include other devices such as a hard disk drive 160, CD ROM drive 170, an audio card 176, a keyboard 178, a basic input/output system ROM 180, and other devices as desired and which are not shown in FIG. 1. The embodiment shown in FIG. 1 is representative of a portable (i.e., "laptop") computer system, although the invention also can apply to handheld computer devices, desktop computers, and other types of electronic devices in which it is desirable to transition the device between different power modes of operation.

The CPU mobile module 102, which preferably is the Mobile Module Connector 2 (MMC-2) manufactured by Intel® Corp., couples to a graphics accelerator 110 by way of a graphics bus 108 and to main memory 120 via a memory bus 122. The CPU mobile module 102 also provides an interface to a peripheral component interconnect ("PCI") bus 130. The graphics accelerator 110 can be any suitable accelerator such as a 3D Rage LT Pro manufactured by ATI Technologies Inc. Display 112 preferably is an active matrix thin film transistor ("TFT") display, but generally can be any suitable display device such as a virtual retinal display ("VRD") or liquid crystal display ("LCD"). The graphics bus 108 coupling the graphics accelerator 110 to the CPU mobile module 102 preferably comprises an advanced graphics port ("AGP") or other suitable bus architecture.

Graphics accelerator 110 preferably controls rendering of text and 2D and/or 3D graphics on display 112. The graphics accelerator 110 processes graphics data structures which can be effectively shifted into and out of main memory 120. The graphics accelerator 120 therefore may be a master of the AGP bus 108 in that it can request and receive access to main memory 120. Dedicated graphics bus 108 accommodates rapid retrieval of data from main memory 120.

The PCI bus 130 couples various peripheral devices to the CPU mobile module 102. One such peripheral device is shown as PCI device 128 which may represent a telephony card, network interface card, or other peripheral components. Bus bridge device 200 also couples to CPU mobile module 102 by way of the PCI bus 130.

The bus bridge device 200, which preferably is the 82371AB PCI-to-ISA/IDE Xcelerator (PIIX4 or PIIX4E) device manufactured by Intel® Corp., performs several functions. One function is to provide a communication path between devices coupled to the PCI bus 130 to devices coupled to a second peripheral bus 174. As shown, peripheral bus 174 may be implemented according to the industry standard architecture ("ISA") bus or extended input/output (EIO) bus which generally is a subset of the ISA bus. The bus bridge device 200 also provides interfaces to a hard disk drive 160, CD ROM drive 170 and one or more universal serial bus ("USB") ports 166. The USB ports 166 are useful for connecting various peripheral components such as cameras and scanners to the computer system 100.

Various devices may couple through the ISA bus 174 to the bus bridge 200. Several examples are shown in FIG. 1 as an audio subsystem 176, a keyboard 178, and a basic input/output system read only memory ("BIOS ROM") 180. The BIOS includes low level instructions that the CPU mobile module 102 executes to perform boot-up testing and initialization and various input/output functions such as storing data on the hard disk drive 160. The BIOS instructions (also referred to as "code") are stored permanently in a non-volatile memory device such as the ROM 180 shown in FIG. 1. During or after system initialization, the BIOS code is transferred to main memory 120 and executed thereafter by the CPU mobile module 102 from main memory.

Referring still to FIG. 1, CPU mobile module 102 includes a CPU core 104 and memory controller and bridge logic 106. The CPU core 104 preferably comprises any suitable CPU such as the Intel Pentium® II. The CPU core 104 represents the primary logic unit for executing program instructions and otherwise generally controlling the operation of computer system 100.

The memory controller and bridge logic 106 provides an interface to the CPU core 104, main memory 120, and PCI bus 130. The memory controller and bridge logic 106 includes temporary memory read and write request buffers for storing pending read and write requests to be serviced by the memory controller portion of the memory controller and bridge logic 106. The memory controller portion generally includes logic to control access to main memory 120. That logic includes arbitration logic which determines which memory request among a plurality of pending memory requests is to be serviced next.

Also shown in FIG. 1 is a clock generator 140 and stop clock logic 150. The clock generator 140 preferably is an ICS9248 manufactured by ICS and generates the CPU clock signal (CPUCLK) provided to the CPU mobile module 102. The stop clock logic 150 asserts a signal to the clock generator 140 in response to signals from the CPU mobile module 102 and bus bridge device 200 to turn the CPUCLK signal on or off as desired. In accordance with the preferred embodiment of the invention, stop clock logic 150 comprises a logic AND gate commonly known in the art. The input signals to stop clock logic 150 include a CPU Stop signal, CPU_STP# (the # symbol denotes that the signal is active low), and a Voltage Regulator Changing signal, VRChgng#. The CPU_STP# signal, when asserted, is used by the clock generator 140 to disable the CPU clock output signals. When asserted, the VRChgng# signal indicates that a Geyserville mode change between high performance and low power modes (described below) is in progress. When the CPU mobile module 102 deasserts the VRChgng# signal the new state is provided to the CPU core 104. The output signal from stop clock logic 150 preferably is provided to a CPU_STP# input pin on the clock generator 140. The clock generator's input pin also can be driven by a Geyserville CPU stop signal, G_CPU_STP#, asserted by the CPU mobile module 102. The G_CPU_STP# signal is asserted by the mobile module 102 when the CPU core 104 determines that its clock must be halted such as for transitioning into a sleep state.

As is shown in FIG. 1, the VRChgng# signal from the CPU mobile module 102 also is provided to either General Purpose Input (GPI) 20 or 21 of the bus bridge device 200, or any other suitable GPI of the bridge device. Further, the bus bridge's General Purpose Output (GPO) 11, or other suitable GPO, connects to the Geyserville Lo/Hi# (G_LO/HI#) input of the CPU mobile module 102. The GPO11 generally can be programmed for any desired purpose and is programmed in accordance with the preferred embodiment to receive the G_LO/HI# input signal which is asserted by the bus bridge 200 to signal to the CPU mobile module 102 that a Geyserville state change should begin. The use of the GPI 20/21, GPO11, G_LO/HI#, VRChgng#, G_CPU_STP#, and CPU_STP# signals will be explained in further detail below with respect to FIGS. 3 and 4.

The preferred embodiment of the invention is implemented to enable and initiate a break event through the use of various registers preferably included in a register set 210 shown in FIG. 1 as part of the bus bridge device 200. The following discussion describes each of the registers in register set 210 that are used in the preferred embodiment of register set 210. It should be noted that register set 210 may include additional registers not shown and described herein. Further, the register set 210 need not be included as part of bus bridge device 200.

Figure 2B:
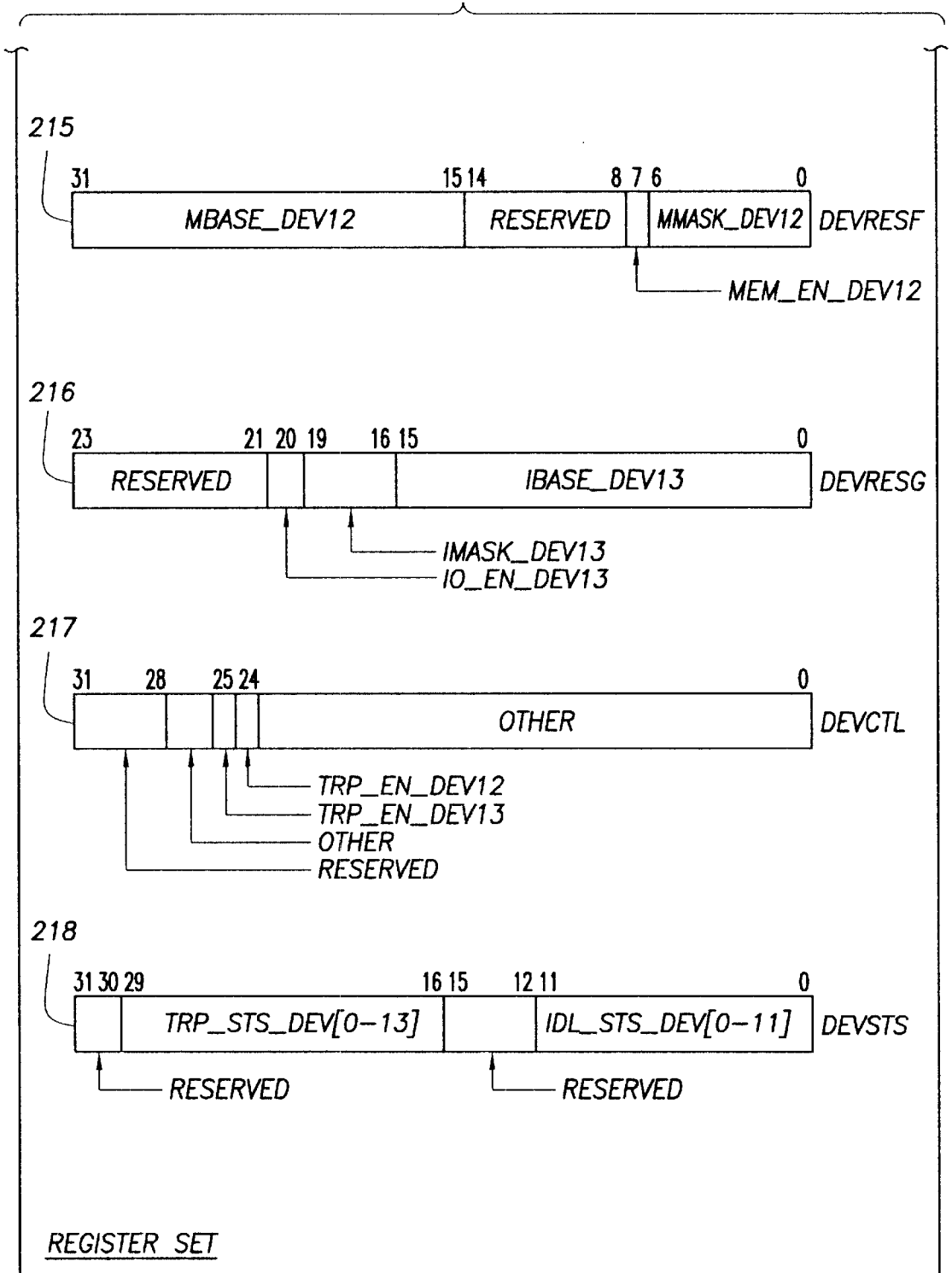
FIG. 2 shows the programmable registers included in a register set that are used to program a break event in accordance with the preferred embodiment to signal the computer's power management logic that the mode switch has completed.

Referring now to FIG. 2, the registers used to implement the preferred embodiment of the invention are shown as registers 211–218. Register 211 is the General Purpose Input Control (GPICTL) register. Register 212 is the Device Activity A (DEVACTA) register. Register 213 is the Device Resource A (DEVRESA) register. Registers 214 and 215 are the Device Resource E (DEVRESE) and F (DECRESF) registers, respectively. Register 216 is the Device Resource G (DEVRESG) register and register 217 is the Device Control (DEVCTL) register. Register 218 is the Device Status (DEVSTS) register. The functions and bit descriptions of each of these registers is shown below in Table I.

TABLE I

Register Set 210 Description.

| Bit | Description |
|---|---|
| GPICTL 211 | |
| 31–28 | Reserved |
| 27 | GPI Edge Select (GPI_EDG_DEV13)-R/W. Selects edge or level sensitivity of device monitor 13 GPI signal. 0 = level. 1 = edge. |
| 26 | GPI Edge Select (GPI_EDG_DEV12)-R/W. Selects edge or level sensitivity of device monitor 12 GPI signal. 0 = level. 1 = edge. |
| 25:13 | GPI polarity select (GPI_PO well_DEV [1:13])-R/W. Selects the assertion polarity for an enabled GPI signal for device monitors 1–13. 0 = asserted high. 1 = asserted low. Bit 25 corresponds to device monitor 13 and bit 13 corresponds to device monitor 1. |
| 12:0 | GPI Enable (GPI_EN_DEV [1:13])-R/W. 1 = enable the device monitor's GPI signal into the trap and decode logic for devices [13:1]. 0 = disable. Bit 12 corresponds to device monitor 13 and bit 0 corresponds to device monitor 1. |
| DEVACTA | |
| 31 | Device 5 Read Load Select (BRLD_SEL_DEV5)-R/W. Selects which burst timer is reloaded upon an enabled device monitor 5 idle event. 0 = reload the slow burst timer. 1 = reload the fast burst timer. |
| 30 | Device 3 Read Load Select (BRLD_SEL_DEV 3)-R/W. Selects which burst timer is reloaded upon an enabled device monitor 3 idle event. 0 = reload the slow burst timer. 1 = reload the fast burst timer. |
| 29 | Device 2 Read Load Select (BRLD_SEL_DEV 2)-R/W. Selects which burst timer is reloaded upon an enabled device monitor 2 idle event. 0 = reload the slow burst timer. 1 = reload the fast burst timer. |
| 28 | Device 1 Read Load Select (BRLD_SEL_DEV 1)-R/W. Selects which burst timer is reloaded upon an enabled device monitor 1 idle event. 0 = reload the slow burst timer. 1 = reload the fast burst timer. |
| 27:14 | Burst Timer Reload Enable (BRLD_EN_DEV [0–13])-R/W. 1 = enable reload events from the respective device monitor to reload the enabled burst timer or generate a stop break event. 0 = disable. Bit 27 corresponds to device monitor 13 and bit 14 corresponds to device monitor 0. |
| 13:0 | Global Timer Reload Enable Bits (GRLD_EN_DEV |

TABLE I-continued

Register Set 210 Description.

| Bit | Description |
|---|---|
| | [0–13])-R/W. 1 = enable reload events from the respective device monitor to reload the global standby timer. 0 = disable. Bit 13 corresponds to device monitor 13 and bit 0 corresponds to device monitor 0. |
| DEVACTB | |
| 31:25 | Reserved. |
| 25 | APMC Enable (APMC_EN)-R/W. 1 = enable generation of SMI# when APMC is read and SMI# is enabled. 0 = disable. |
| 24 | Video Enable (VIDEO_EN)-R/W. 1 = enable the video detect (PCI bus utilization) logic to generate a timer reload event for device monitor 11. 0 = disable. This logic detects PCI bus utilization as set by the two fields BUS_UTIL, and %BUS_UTIL. |
| 23:16 | Percentage Bus Utilization Threshold (%BUS_UTIL)-R/W. This field controls the percentage of time that the minimum bus utilization threshold must be maintained in order to generate a video event. The actual count is measured by the number of time slices that exceed BUS_UTIL within a 256 time slice window. |
| 15:8 | Bus Utilization Threshold (BUS_UTIL)-R/W. This field controls the threshold for bus utilization detection. If the video detect logic finds more PCI data phases than specified by BUS_UTIL within a 256 clock period, then that time slice is counted. |
| 7 | Reserved. |
| 6 | IRQ Global Reload Enable (GRLD_EN_IRQ)-R/W. 1 = enable an unmasked IRQ, NMI, or INIT to, when asserted, reload the Global Standby Timer. 0 = disable. |
| 5 | IRQ8# Clock Event Enable (BRLD_EN_IRQ8)-R/W. 1 = enable an unmasked IRQ8# to, when asserted, generate a fast burst timer reload or stop break event. 0 = disable. |
| 4 | PME Clock Event Enable (BRLD_EN_PME)-R/W. 1 = enable an asserted SMI#, GPI1#, PWRBTN#, or LID signal to generate a fast burst timer reload or stop break event. 0 = disable. |
| 3 | Undefined. Must be written as a 0. |
| 2 | Keyboard/Mouse Global Reload Enable (GRLD_EN_KBC_MS)-R/W. 1 = enable an assertion of IRQ1 or IRQ12/M to reload the Global Standby Timer. 0 = disable. |
| 1 | IRQ Clock Event Enable (BRLD_EN_IRQ)-R/W. 1 = enable an unmasked IRQ, NMI, or INIT to generate a burst event or stop break event. 0 = disable. |
| 0 | IRQ0 Clock Event Enable (BRLD_EN_IRQ0)-R/W. 1 = enable an unmasked IRQ0 to generate a burst event or stop break event. 0 = disable. |
| DEVRESA | |
| 31 | Device 8 EIO (EIO_EN_DEV8)-R/W. 1 = enable PCI access to the device 8 enabled I/O ranges to be claimed by PIIX4 and forwarded to the ISA/EIO bus. 0 = Disable. The LPT_MON_EN must be set to enable the decode. |
| 30 | Device 13 EIO Enable (EIO_EN_DEV13)-R/W. 1 = Enable PCI accesses to the device 13 enabled memory and I/O ranges to be claimed by PIIX4 and forwarded to the ISA/EIO bus. 0 = Disable. The MEM_EN_DEV13 or IO_EN_DEV13 must be set to enable the memory or IO decodes respectively. |
| 29 | Device 12 EIO Enable (EIO_EN_DEV12)-R/W. 1 = Enable PCI accesses to the device 12 enabled memory and I/O ranges to be claimed by PIIX4 and forwarded to the ISA/EIO bus. 0 = Disable. The MEM EN_DEV12 or IO_EN_DEV12 must be set to enable the memory or IO decodes respectively. |
| 28 | Device 11 Keyboard Enable (KBC_EN_DEV11)-R/W. 1 = Enable PCI bus decode for accesses to keyboard controller I/O ports (60h and 65h). 0 = Disable. The EIO enable bit, idle enable bit, or trap enable bit for this device must also be set in order to enable these respective functions. |
| 27 | Graphics A/B Segment Memory Enable (GPAPH_AB_EN)-R/W. 1 = Enable PCI bus decode for accesses to the PC compatible frame butter ranges (A and B segments). 0 = Disable. PIIX4 does not positive decode these accesses for forwarding to the ISA bus. |
| 26 | Graphics I/O Enable (GRAPH_IO_EN)-R/W. 1 = Enable PCI bus decode for accesses to the VGA I/O addresses (3B0h-3DFh). 0 = Disable. PIIX4 does not positive decode these accesses for forwarding to the ISA bus. |
| 25 | SoundBlaster EIO Enable (SB_EIO_EN)-R/W. 1 = Enable PCI bus decode for accesses to the SoundBlaster device enabled decode ranges (bits[3,5:6]) to be claimed by PIIX4 and forwarded to the ISA/EIO bus. The SB_EN bit must be set to enable their respective ranges. 0 = Disable. |
| 24 | Linear Frame Buffer Decode Enable (LFB_DEC_EN)-R/W. 1 = Enable PCI bus decode for accesses to the generic memory range for linear frame buffer. 0 = Disable. The linear frame buffer address range is defined by the linear frame buffer base address and mask bits (bits[23:10]). PIIX4 does not positive decode these accesses for forwarding to the ISA bus. |
| 23:22 | Linear Frame Buffer Mask (LFB_MASK_DEV11)-R/W. This field defines a 2-bit mask for the linear frame buffer address, corresponding to AD[21:20]. A '1' in a bit position indicates that the corresponding address bit is masked (i.e. ignored) when performing the decode. This field defines the size of the linear frame buffer window. Note that programming these bits to '10' results in a split address range. |
| 21:10 | Linear Frame Buffer Base Address (LFB_BASE_DEV11)-R/W. This field defines the 12-bit memory base address range, corresponding to AD[31:20] for the linear buffer address. This field in conjunction with the LFB_MASK_DEV11 field defines a 1-8-Mbyte linear frame buffer that can be enabled for monitoring using the device monitoring system 11. |
| 9:8 | Microsoft ® Sound System Select (MSS_SEL)-R/W. |
| 7 | Microsoft ® Sound System Decode Enable (MSS_EN)-R/W. |
| 6:5 | Sound Blaster Decode Select (SB_SEL)_R/W. |
| 4 | Game Port Enable (GAME_EN). 1 = enable PCI bus decode for accesses to the game port I/O. 0 = disable. |
| 3 | Sound Blaster 8/16-bit Decode Enable (SB_EN) - R/W. |
| 2:1 | MIDI Decode Logic (MIDI_SEL) - R/W. |
| 0 | MIDI Enable (MIDI_EN) - R/W. |
| DEVRESE | |
| 23:21 | Reserved. |
| 20 | Device 12 I/O Monitor Enable (IO_EN_DEV12)-R/W. 1 = Enable PCI bus decode for accesses to the I/O address range selected by the IBASE_DEV12 and IMASK_DEV12 fields. 0 = Disable. The EIO enable bit, or trap enable bit for device 12 must also be set in order to enable these respective functions. |
| 19:16 | Device 12 I/O Decode Mask (IMASK_DEV12)-R/W. Specifies the 4-bit I/O base address mask used to determine the I/O address range size for device 12 accesses. IMASK_DEV12 (bits[19:16]) correspond to AD[3:0]. A '1' in a bit position indicates that the corresponding address bit is masked (i.e. ignored) when performing the decode. Note that programming these bits to certain patterns (such as '1001') results in a split address range. |
| 15:0 | Device 12 I/O Decode Base Address (IBASE_DEV12)-R/W. Specifies the 16-bit I/O base address range (AD[15:0]) for the device 12 I/O range. When this field is combined with IMASK_DEV12 field, an I/O range is defined starting from the base address register value to the size defined by the mask register. |
| DEVRESF | |
| 31:15 | Device 12 Memory Decode Base Address (MBASE_DEV12)-WW. Specifies the 17-bit memory base address range (AD[31:15]) for the device 12 memory range. When this field is combined with the MMASK_DEV12 field, a memory range is defined from the base address value to the size defined by the mask register |
| 14:8 | Reserved. |
| 7 | Device 12 Memory Monitor Enable |

TABLE I-continued

Register Set 210 Description.

| Bit | Description |
|---|---|
| | (MEM_EN_DEV12)-R/W. 1 = Enable PCI bus decode for accesses to the memory address range selected by the MBASE_DEV12 and MMASK_DEV 12 fields. 0 = Disable. The EIO enable bit, or trap enable bit for device 12 must also be set in order to enable these respective functions. |
| 6:0 | Device 12 Memory Decode Mask (MMASK_DEV12)-R/W. Specifies the 7-bit memory base address mask used to determine the memory address range size for device 12 accesses. MMASK_DEV12 (bits[6:0]) correspond to AD[21:15]. A '1' in a bit position indicates that the corresponding address bit is masked (i.e. ignored) when performing the decode. Note that programming these bits to certain patterns (such as '1110011') results in split address ranges. |
| DEVRESG | |
| 23:21 | Reserved. |
| 20 | Device 13 I/O Monitor Enable (IO_EN_DEV13)-R/W. 1 Enable PCI bus decode for accesses to the I/O address range selected by the IBASE_DEV13 and IMASK_DEV13 fields. 0 = Disable. The EIO enable bit or trap enable bit for device 13 must also be set in order to enable these respective functions. |
| 19:16 | I/O Decode Mask (IMASK_DEV13)-R/W. Specifies the 4-bit I/O base address mask used to determine the I/O address range size for device 13 accesses. IMASK_DEV13 (bits[19:16]) correspond to AD |
| 15:0 | I/O Decode Base Address (IBASE_DEV13)-R/W. Specifies the 16-bit I/O base address range (AD[15:0]) for the device 13 I/O range. When this field is combined with IMASK_DEV13 field, an I/O range is defined starting from the base address register value to the size defined by the mask register. |
| DEVSTS | |
| 31:30 | Reserved. |
| 29:16 | Device [0–13] Trap Status Bits (TRP_STS_DEV[0–13])-R/W. 1 = An SMI# was generated by an I/O trap to the associated device monitor's enabled address range. 0 = No SMI# was generated. Bit 29 corresponds to device monitor 13 and bit 16 corresponds to device monitor 0. This bit is cleared by writing a 1 to is bit position. |
| 15:12 | Reserved. |
| 11:0 | Device [0–11 ] Idle Status Bits (IDL_STS_DEV[0–11]-R/W. 1 = An SMI# was generated by the expiration of the associated device monitor's idle timer. 0 = No SMI# was generated. Bit 11 corresponds to device monitor 11 and bit 0 corresponds to device monitor 0. This bit is cleared by writing a 1 to its bits position. |
| DEVCTL | |
| 31:28 | Reserved. |
| 27 | Device 8 Bus Master Reload Enable (BM_RLD_DEV8)-R/W. 1 = Enable any PCI Bus Master request (PHOLD#. PCIREQA[0:3] to reload the device monitor idle timer. 0 = Disable. |
| 26 | Device 3 Idle Reload Enable (IDL_RLD_EN_DEV3)-R/W. 1 = Enable the device monitor 3 idle reload events to reload the device monitor 3 idle timer. 0 = Disable. When device 3 is being used as a software SMI timer, this bit should be cleared to prevent any events from reloading the timer. |
| 25 | Device 13 Trap Enable (TRP_EN_DEV13)-R/W. 1 = Enable generation of a trap SMI for accesses to the device monitor 13 enabled trap decode ranges. 0 = Disable. |
| 24 | Device 12 Trap Enable (TRP_EN_DEV12)-R/W. 1 = Enable generation of a trap SMI for accesses to the device monitor 12 enabled trap decode ranges. 0 = Disable. |
| 23 | Device 11 Trap Enable (TRP_EN_DEV11)-R/W. 1 = Enable generation of a trap SMI for accesses to the device monitor 11 enabled trap decode ranges. 0 = Disable. |
| 22 | Device 11 Idle Enable (IDL_EN_DEV11)-R/W. 1 = Enable the device monitor 11 idle reload events to reload the device monitor 11 idle timer. 0 = Disable. |
| 21 | Device 10 Trap Enable (TRP_EN_DEV10)-R/W. 1 = Enable generation of a trap SMI for accesses to the device monitor 10 enabled trap decode ranges. 0 = Disable. |
| 20 | Device 10 Idle Enable (IDL_EN_DEV10)-R/W. 1 = Enable the device monitor 10 idle reload events to reload the device monitor 10 idle timer. 0 = Disable. |
| 19 | Device 9 Trap Enable (TRP_EN_DEV9)-R/W. 1 = Enable generation of a trap SMI for accesses to the device monitor 9 enabled trap decode ranges. 0 = Disable. |
| 18 | Device 9 Idle Enable (IDL_EN_DEV9)-R/W. 1 = Enable the device monitor 9 idle reload events to reload the device monitor 9 idle timer. 0 = Disable. |
| 17 | Device 8 Trap Enable (TRP_EN_DEV8)-R/W. 1 = Enable generation of a trap SMI for accesses to the device monitor 8 enabled trap decode ranges. 0 = Disable. |
| 16 | Device 8 Idle Enable (IDL_EN_DEV8)-R/W. 1 = Enable the device monitor 8 idle reload events to reload the device monitor 8 idle timer. 0 = Disable. |
| 15 | Device 7 Trap Enable (TRP_EN_DEV7)-R/W. 1 = Enable generation of a trap SMI for accesses to the device monitor 7 enabled trap decode ranges. 0 = Disable. |
| 14 | Device 7 Idle Enable (IDL_EN_DEV7)-R/W. 1 = Enable the device monitor 7 idle reload events to reload the device monitor 7 idle timer. 0 = Disable. |
| 13 | Device 6 Trap Enable (TRP_EN_DEV6)-R/W. 1 = Enable generation of a trap SMI for accesses to the device monitor 6 enabled trap decode ranges. 0 = Disable. |
| 12 | Device 6 Idle Enable (IDL_EN_DEV6)-R/W. 1 = Enable the device monitor 6 idle reload events to reload the device monitor 6 idle timer. 0 = Disable. |
| 11 | Device 5 Trap Enable (TRP_EN_DEV5)-R/W. 1 = Enable generation of a trap SMI for accesses to the device monitor 5 enabled trap decode ranges. 0 = Disable. |
| 10 | Device 5 Idle Enable (IDL_EN_DEV5)-R/W. 1 = Enable the device monitor 5 idle reload events to reload the device monitor 5 idle timer. 0 = Disable. |
| 9 | Device 4 Trap Enable (TRP_EN_DEV4)-R/W. 1 = Enable generation of a trap SMI for accesses to the device monitor 4 enabled trap decode ranges. 0 = Disable. |
| 8 | Device 4 Idle Enable (IDL_EN_DEV4)-R/W. 1 = Enable the device monitor 4 idle reload events to reload the device monitor 4 idle timer. 0 = Disable. |
| 7 | Device 3 Trap Enable (TRP_EN_DEV3)-R/W. 1 = Enable generation of a trap SMI for accesses to the device monitor 3 enabled trap decode ranges. 0 = Disable. |
| 6 | Device 3 Idle Enable (IDL_EN_DEV3)-R/W. 1 = Enable the device monitor 3 idle reload events to reload the device monitor 3 idle timer. 0 = Disable. |
| 5 | Device 2 Trap Enable (TRP_EN_DEV2)-R/W. 1 = Enable generation of a trap SMI for accesses to the device monitor 2 enabled trap decode ranges. 0 = Disable. |
| 4 | Device 2 Idle Enable (IDL_EN_DEV2)-R/W. 1 = Enable the device monitor 2 idle reload events to reload the device monitor 2 idle timer. 0 = Disable. |
| 3 | Device 1 Trap Enable (TRP_EN_DEV1)-R/W. 1 = Enable generation of a trap SMI for accesses to the device monitor 1 enabled trap decode ranges. 0 = Disable. |
| 2 | Device 1 Idle Enable (IDL_EN_DEV1)-R/W. 1 = Enable the device monitor 1 idle reload events to reload the device monitor 1 idle timer. 0 = Disable. |
| 1 | Device 0 Trap Enable (TRP_EN_DEV0)-R/W. 1 = Enable generation of a trap SMI for accesses to the device monitor 5 enabled trap decode ranges. 0 = Disable. |
| 0 | Device 0 Idle Enable (IDL_EN_DEV0)-R/W. 1 = Enable the device monitor 0 idle reload events to reload the device monitor 0 idle timer. 0 = Disable. |

In accordance with the preferred embodiment of the invention, computer system 100 operates in one of at least two modes: a high performance mode and a low performance mode. While in the high performance mode, the CPU core 104 internal clock signal (not shown) is at a higher frequency, such as 650 MHz, and in the low power mode, the internal clock signal is at a lower frequency, such as 500 MHz. The CPU core internal clock signal is produced using the CPUCLK signal generated by the clock generator 140. The high performance mode is preferred when, in the case of a laptop, the computer system 100 receives its power from an AC adapter. The low power mode is preferred when it is desirable for the computer to conserve power, such as when operating off a battery. The CPU core 104 consumes less power and generates less heat when its clock signal is operating at a lower frequency. Additionally, the CPU core voltage preferably is reduced in the low speed mode by a voltage regulator (not shown) internal to the CPU mobile module 102. By lowering the CPU core voltage, the CPU mobile module consumes less power.

In general, the preferred embodiment of computer system 100 makes it possible for the computer to change states between the low power and high performance modes. In particular, through interactions between the CPU mobile module 102, clock generator 140, stop clock logic 150, and bus bridge device 200, the computer system 100 is able to change the CPU core clock frequency while avoiding the problems with the prior art as discussed above. The switch between the modes is referred to as a "Geyserville mode switch." During a Geyserville mode switch, computer system 100 desirably prevents the CPU core 104 from being interrupted by events unrelated to the Geyserville mode switch to avoid locking up the computer system. Preferably, CPU core 104 puts itself into a reduced power "sleep" state during a Geyserville mode switch and enables a "break event" that, when subsequently initiated, transitions the CPU core 104 out of the sleep state. The rest of the computer system 100 preferably remains fully active while the CPU core 104 is asleep. Alternatively, the low power mode may include placing the entire computer system into a sleep state. In accordance with the preferred embodiment, the break event is initiated only by Geyserville logic that detects when the Geyserville mode switch is completed. That is, the break event preferably cannot be triggered by events unrelated to be Geyserville mode switch (e.g., thermal event, hot key activation, and device change SMI or SCI from an embedded controller such as a keyboard controller). The transition to and from the sleep state preferably is in accordance with the Advanced Configuration and Power Interface (ACPI) specification, written collaboratively by Intel, Microsoft, and Toshiba. The ACPI specification generally permits the computer's operating system (e.g., Windows® 98 and Windows® NT) to manage the power functions of the computer. The sleep state into which the CPU core 104 preferably is transitioned during the Geyserville mode switch is the ACPI "C3" state and the computer system fully operational mode is the "S3" state. Further, completion of the mode switch will not be slowed down by non-Geyserville related events such as thermal events or hot key activation. Overall computer system performance thereby is increased.

Unless precautions are taken, it is possible for a device within a conventional computer system to request that the CPU be awakened from the sleep state before the Geyserville mode switch has completed. This situation also may cause the computer system to lock up as the CPU may be requested to execute an instruction during the Geyserville mode switch. As an example, a modem may receive an incoming communication signal, such as a telephone call, while the computer is in the midst of a Geyserville mode switch. Without proper precautions, the modem could interrupt the Geyserville mode switch and request CPU support to process the incoming communication signal. Thus, it is desirable to permit the Geyserville mode switch to complete without interruption.

The preferred embodiment of the invention accomplishes this goal by permitting the CPU to be transitioned out of the sleep state, upon completion of a Geyserville mode switch, only by assertion of a particular signal that is inaccessible by most logic or devices in the computer system. Specifically, the signal used to initiate a break event preferably can only be asserted by logic that is aware of when the Geyserville mode switch is complete. The following discussion illustrates the use of the preferred embodiment shown in FIG. 1 to implement Geyserville break event logic in accordance with these principles.

Figure 3:
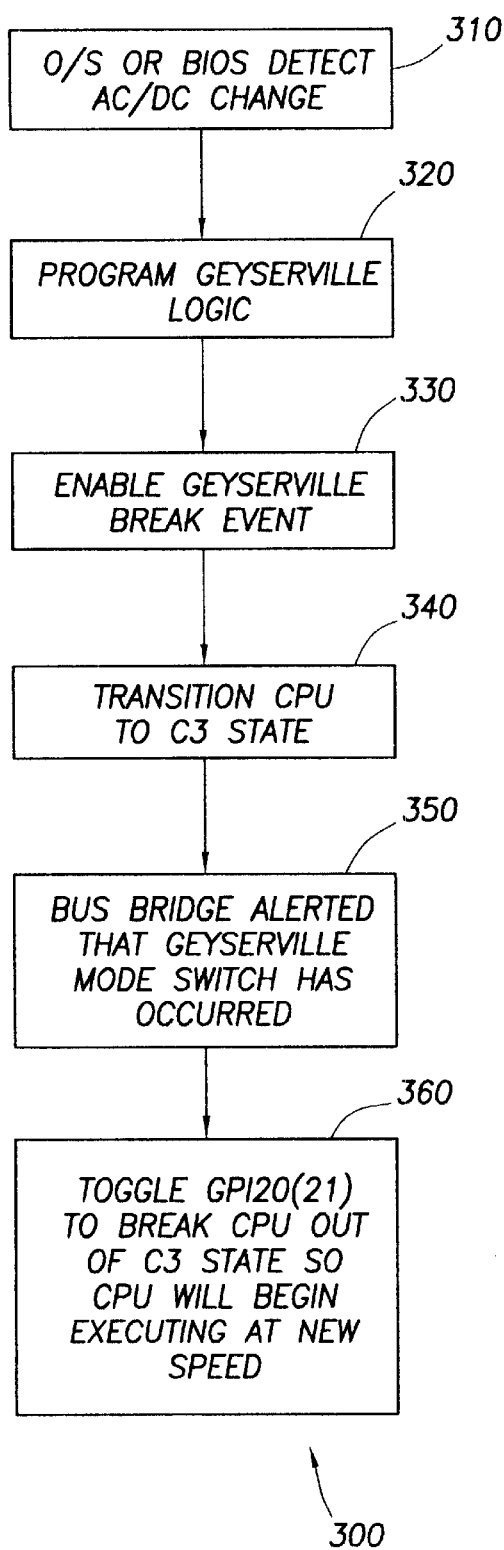
FIG. 3 is a flow chart showing the preferred steps for configuring a break event in accordance with the preferred embodiment of the invention using the registers shown in FIG. 2.

FIG. 3 shows a preferred method 300 for programming a break event to wake the CPU core 104 following completion of a Geyserville mode switch. In step 310, the operating system, which for example may be Microsoft's Windows® 95 or Windows® 98, or BIOS code detects a change in the source of the computer's power. The change may be from AC power to battery power (DC) such as when the computer is unplugged from a wall outlet and permitted to continue operating off battery power. Alternatively, the change may be from DC to AC power such as when the computer is operating off battery power and then plugged into the wall to continue operating off AC power. When either of these changes in power occurs, a signal is asserted that alerts the operating system or BIOS that a change in power state has occurred.

The change in power detected in step 310 triggers a Geyserville mode switch. In step 320, the Geyserville mode switch begins by programming the Geyserville control logic (not specifically shown in FIG. 1) internal to the CPU mobile module 102. This programming step preferably is performed by the bus bridge 200 causing a change in the logic state of its GPO11 output signal provided as the G_LO/HI# input signal to the CPU mobile module 102. The Geyserville control logic reacts to a logic level change for G_LO/HI# by directing the CPU core 104 to begin changing the CPU's clock frequency and voltage level.

Figure 4:
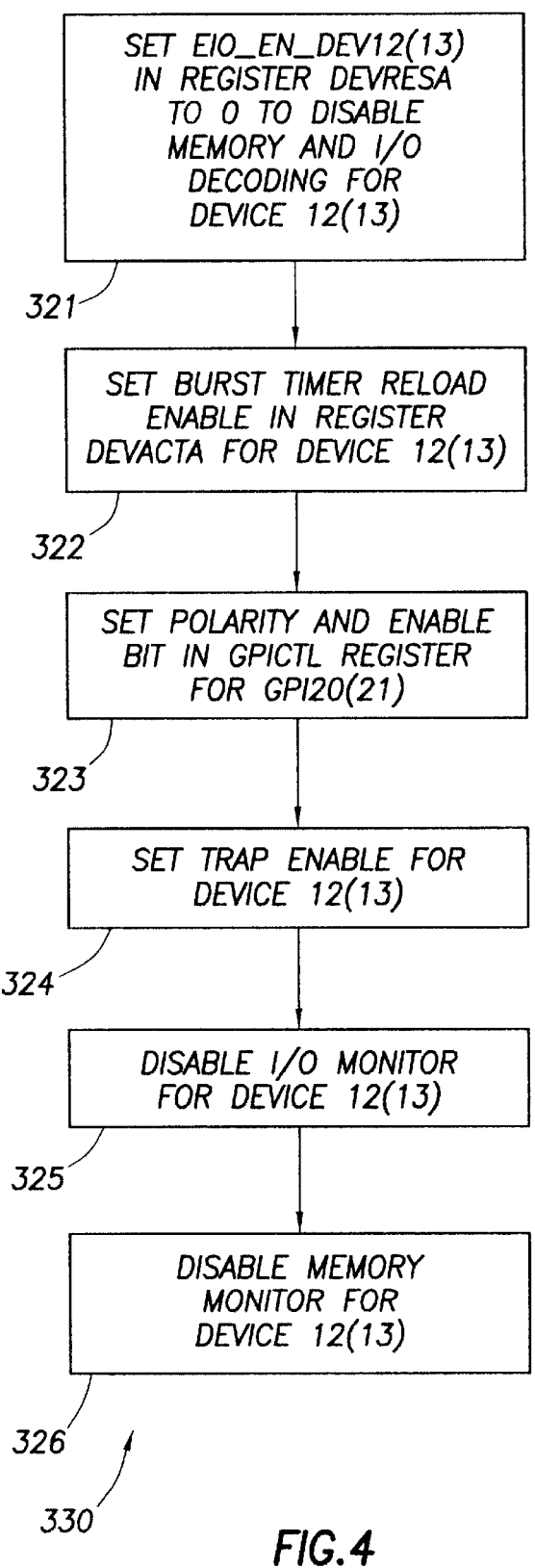
FIG. 4 is a flow chart showing further detail of one of the steps of the flow chart of FIG. 3.

After the Geyserville control logic is programmed in step 320, the computer system 100 enables a Geyserville break event in step 330. FIG. 4 described below provides further detail for a preferred embodiment of step 330. Generally, in step 330 registers in registers set 210 are programmed to configure a break event that is subsequently triggered by logic that detects the end of the Geyserville mode switch. In step 340, the CPU core 104 transitions to a sleep state (preferably C3) while the Geyserville mode switch occurs. In steps 350 and 360, upon completion of the mode switch, the CPU core 104 preferably transitions out of the sleep state to a desired operational state, such as a fully operational state. The occurrence of a break event signals the computer system 100 to break out of the sleep state preferably returning to the fully operational state.

Referring to FIGS. 1 and 3, during a Geyserville mode switch, the CPU core 104 is placed into a sleep state to permit the CPU clock frequency and voltage level to change levels. Before the Geyserville mode switch begins, any instruction the CPU core 104 is executing at the time G_LO/HI# is asserted preferably is allowed to continue executing until completion. At that time, the CPU core 104 is prevented from executing additional instructions and the computer system is placed into a sleep state so that the Geyserville logic can effectuate the desired change to the CPU clock frequency and voltage level. While the Geyserville mode switch is occurring, the CPU asserts low its VRChgng# signal to alert system components such as the bus bridge device 200 that a Geyserville mode switch is under way. If the ACPI logic is implemented in computer system 100, the sleep state includes any of the sleep states defined by the ACPI specification, but preferably is the C3 state. Some system components, such as external peripheral devices, are incapable of monitoring the state of the VRChgng# signal and thus are unaware of an ongoing Geyserville mode switch. As described below, the preferred embodiments of the invention preclude these components from initiating a break event while the computer is transitioning between modes of operation, such as during a Geyserville mode switch.

Once the Geyserville mode switch is complete, the CPU core 104 preferably is transitioned from the sleep state to a fully operational or other desired state. In step 350, the CPU mobile module 102 preferably alerts the bus bridge device 200 that the Geyserville mode switch has completed. This step preferably is accomplished by the CPU mobile module deasserting the VRChgng# signal to the bus bridge device. The VRChgng# signal from the CPU mobile module 200 is provided to either the GPI20 or GPI21 general purpose input signals to the bus bridge device 200. The following description generally refers to the GPI20 input signal on the bus bridge device 200 with the understanding that other input signals on the bus bridge device, such as GPI21, could be used in accordance with the principles described herein.

Previous techniques for initiating a break event after a Geyserville mode switch have required the assertion of a signal that is shared by other components in the computer system. In such prior art systems, a break event could be initiated by other system components when a Geyserville mode switch may not have completed. Initiating a break event during a Geyserville mode switch may cause the computer system to lock up as noted above.

The preferred embodiments of the present invention prevent this problem from occurring by implementing an improved Geyserville break event technique. The preferred break event technique of the preferred embodiment uses the GPI20 input signal on the bus bridge device 200 to initiate the break event as is shown in step 360. Preferably, computer system 100 is configured so that only CPU mobile module 102 can assert GPI20 to the bus bridge 200. Assertion of GPI20 preferably initiates a break event to wake the computer following a Geyserville mode switch. Typically, GPI20 is not shared by other devices besides the CPU mobile module 102. Because only the CPU mobile module 102 can assert GPI20, only CPU mobile module 102 can initiate a break event to wake up the computer following a Geyserville mode switch. Accordingly, in accordance with the preferred embodiment of the invention, a break event is initiated by the CPU mobile module 102 toggling a signal to the bus bridge device 200 input signal that preferably is not shared by any other system component besides the CPU mobile module 102. The signal that is toggled preferably is the bus bridge device's GPI20 input signal, although other signals, such as GPI21, consistent with these principles can also be used to initiate the break event. Moreover, any device monitor, or other monitoring mechanism, that can detect an asserted bus bridge 200 input signal, that is not shared by devices other than that CPU mobile module 102, can be used to implement the break event. The bus bridge 200 preferably uses "device monitors," which are explained below, to detect when the GPI20 (or GPI21) signals have been asserted by the CPU mobile module 102.

Bus bridge 200 preferably implements a number of device monitors (not specifically shown in FIG. 1). The Intel PIIX4 or PIIX4E bridge device, for example, includes 14 device monitors (device monitors 0–13). Generally, each device monitor detects peripheral device activity. The device monitors can detect an idle peripheral device and can trap accesses to a peripheral device that has been powered down. The device monitors in the PIIX4/4E bus bridge are individually configurable through register set 210. Some, or all, of the device monitors can be programmed to monitor the GPI signals. Device monitor 12, for example, can be programmed to monitor GPI20 and device monitor 13 can be programmed to monitor GPI21. If device monitor 12 is programmed to monitor the GPI20 signal, that device monitor will cause a system management interrupt (SMI) to be generated upon detection of an asserted GPI20 input signal. The SMI will be processed by the CPU mobile module 102.

In accordance with the preferred embodiment of the invention, device monitor 12 is used monitor GPI20. As shown in FIG. 1 and described above, CPU mobile module 102 toggles, or otherwise asserts, its VRChgng# signal when the CPU mobile module determines that the Geyserville mode switch has completed. The VRChgng# signal is provided to the GPI20 input of the bus bridge 200, and device monitor 12 reacts to an asserted GPI20 by generating an SMI to break the CPU mobile module 102 out of its sleep state. The GPI20 input signal is preferred for this purpose because, as noted above, it typically is not shared by other devices in the computer besides the CPU mobile module 102, and thus the CPU core 104 will not be prematurely wakened during a Geyserville mode switch. The CPU mobile module 102 services the SMI by transitioning its power state preferably to a fully operational state (S0). The following discussion of FIG. 4 illustrates one method for enabling device monitor 12 to monitor GPI20 to implement the break event.

Referring now to FIG. 4, a preferred sequence of events for implementing step 330 (enabling Geyserville break event) is shown as steps 321–326. The order of the steps may vary as desired. The preferred sequence of events for enabling a Geyserville break event uses the register set 210 shown in FIG. 2 and further described in Table I above. In step 321, the DEVRESA register is programmed to set the EIO_EN_DEV12 bit to zero to disable memory and 110 decoding for device 12. As noted above, if GPI21 is used to implement the break event, device monitor 13 should be used instead of device monitor 12. The burst timer reload enable bit for device 12 in register DEVACTA is set in step 322. This step enables a reload event from device monitor 12 to permit a break event to be generated.

The polarity and enable bits in the GPICTL register are set in step 323 for GPI20 to further configure the break event. This step preferably includes setting the GPI_EDG_DEV12 bit (bit 26) to 0 to trigger the break event upon device monitor 12 detecting a changing edge of the GPI20 signal. Step 323 also includes setting the GPI_POL_DEV12 bit (bit 24) to 0 so that a break event will be detected upon detection of a rising edge of GPI20 (assertion polarity high). Additionally, step 323 includes setting the GPI_EN_DEV12 bit (bit 11) to 1 to enable the device monitor's GPI signal into the trap and idle decode logic (not specifically shown) for device monitor 12. This step permits the bridge device 200 to detect the assertion of a GPI and determine that GPI20 has been asserted.

In step 324, the trap is enabled for device monitor 12 preferably by setting the TRP_EN_DEV12 bit (bit 24) in the DEVCTL register. Enabling the trap for device 12 permits the bus bridge device 12 to generate an SMI when a rising edge of GPI20 is detected by device monitor 12, thereby generating the break event. The I/O monitor and memory monitor for device 12 preferably are disabled in steps 325 and 326, respectively. Disabling the I/O monitor for device 12 is accomplished by setting the IO_EN_

DEV12 bit (bit 20) to 0 in the DEVRESE register. Similarly, disabling the memory monitor for device 12 is accomplished by setting the MEM_EN_DEV12 bit (bit 7) to 0 in the DEVRESF register. Disabling the I/O and memory monitors prevents I/O or memory accesses to an address range associated with device monitor 12, which otherwise would cause an SMI to be generated and initiate a break event. In accordance with the preferred embodiment, only assertion of the GPI20 input signal to the bus bridge device 200 from the CPU mobile module 102 can cause device monitor 12 to generate an SMI. This feature prevents a break event SMI from being generated for any reason not pertaining to the completion of a Geyserville mode switch.

When GPI20 is asserted by the CPU mobile module 102 signaling the completion of a break event, an SMI is generated which preferably causes a power state change from the sleep state (preferably C3) back to a fully operational state (e.g., C0). The SMI event also causes the trap status bit in register DEVSTS to be set. If device monitor 12 is used to implement the break event, the TRP_STS_DEV12 bit (bit 28) will be set to a logic 1 to indicate an SMI was generated by the assertion of GPI20. Once the break event occurs, the TRP_STS_DEV12 bit preferably is cleared by writing a logic 1 to that bit.

The operation of the computer system to perform a Geyserville mode switch and subsequent break event will now be described with reference to FIG. 1. When the operating system or BIOS detect a change in power source (AC to DC or DC to AC), the bus bridge device 200 asserts its GPO11 output signal to the G_LO/HI# input signal of the CPU mobile module 102. In response, the CPU mobile module 102 begins the Geyserville mode switch and asserts VRChgng# which is received as the GPI20 input signal by the bus bridge device 200. An asserted VRChgng# indicates that the Geyserville mode switch is occurring.

Upon detecting an asserted VRChgng# input signal, bus bridge device asserts its CPU stop clock (CPU_STP#) output signal. Stop clock logic 150 receives the VRChgng# from the CPU mobile module 102 and the bus bridge's CPU_STP# signal and, in response to both signals being asserted, asserts a CPU_CTP# clock output signal to the clock generator 140. In response, the clock generator 140 turns off the clock signal (CPUCLK) to the CPU mobile module. The change in the CPU clock frequency and CPU voltage then can be programmed. When the Geyserville mode switch is complete, VRChgng# is deasserted by the CPU mobile module 102. A deasserted VRChgng# signal causes the clock generator 140 to turn on CPUCLK and the CPU mobile module uses that clock signal to generate its own internal clock signal at the newly programmed frequency.

The preferred embodiment described above describes an improved technique for transitioning a computer from AC power to DC power and vice versa. As described, the computer system transitions itself into a sleep state during which various electrical characteristics are changed as desired. For example, the CPU clock speed and operating voltage are lowered when the computer operates from battery power and are increased when the computer operates from AC power. After these changes complete, the CPU mobile module 102 initiates a break event by asserting a general purpose input signal to the bridge device. Preferably, the general purpose input signal chosen to generate a break event is not shared by other system devices, or at least not shared by another device that might attempt to wake up the CPU before the Geyserville mode switch has completed and the changes in the electrical characteristics have equilibrated. Further, the completion of the Geyserville mode switch will not be disturbed or slowed down by non Geyserville-related events.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

What is claimed is:

1. A computer system, comprising:

a CPU module;

a bus bridge device coupled to said CPU module; and a peripheral device coupled to said CPU module;

wherein said bus bridge device adapted to receive as a general purpose input signal an output signal from said CPU module, the general purpose input signal initiating a break event for transitioning the CPU module out of a sleep state, and the bus bridge device programmed so that only the CPU module output signal can initiate a break event while the CPU module is in the sleep state.

2. The computer system of claim 1 further including stop clock logic coupled to and receiving signals from said CPU module and said bus bridge device, the signal received from the CPU module indicative of an ongoing change in voltage and frequency and the signal received from the bus bridge device asserted by the bus bridge device to stop a CPU clock signal.

3. The computer system of claim 1 wherein said bus bridge device includes a plurality of programmable registers that are used to configure the break event.

4. The computer system of claim 1 wherein said peripheral device is a keyboard.

5. The computer system of claim 1 wherein said peripheral device is an audio system.

6. The computer system of claim 2 further including a clock generator to generate the CPU clock signal provided to the CPU module.

7. The computer system of claim 3 wherein the registers include a Device Resource A register in which a bit is set to 0 to disable memory and I/O decoding during the sleep state.

8. The computer system of claim 3 wherein the registers include a Device Resource E register in which a bit is set to 0 to disable an I/O monitor during the sleep state.

9. The computer system of claim 3 wherein the registers include a Device Resource F register in which a bit is set to 0 to disable a memory monitor during the sleep state.

10. A method for configuring a break event to transition a computer from a sleep state during a Geyserville mode switch, comprising:

(a) detecting a power state change;

(b) programming a CPU module to send a Geyserville break event to a bus bridge device in order to transition the CPU from a sleep state; and (c) programming a bus bridge device to initiate the Geyserville break event that can be initiated only upon the bus bridge device detecting the assertion of an input signal by the CPU module.

11. The method of claim 10 wherein step (c) includes:

(c1) setting a bit in a register to disable memory and I/O decoding for a device monitor.

12. The method of claim 10 wherein step (c) includes:

(c2) setting a bit in a register to set the polarity for the input signal to initiate the break event.

13. The method of claim 10 wherein step (c) includes:
(c3) setting a bit in a register to enable a trap for a device monitor associated with the break event.

14. The method of claim 10 wherein step (c) includes:
(c4) setting a bit in a register to disable an I/O monitor for a device monitor associated with the break event.

15. The method of claim 10 wherein step (c) includes:
(c4) setting a bit in a register to disable a memory monitor for a device monitor associated with the break event.

16. A computer system, comprising:
a CPU module;
a bus bridge device coupled to said CPU module; and
stop clock logic coupled to said CPU module and said bus bridge device, said stop clock logic adapted to assert a stop clock control signal that causes a CPU clock signal to stop;
wherein said bus bridge device is adapted to receive as a general purpose input signal an output signal from said CPU module, the general purpose input signal initiating a break event for transitioning the CPU module out of a sleep state during a Geyserville mode switch, and the bus bridge device programmed so that only the CPU module output signal can initiate a break event during a Geyserville mode switch.

17. The computer system of claim 16 wherein said stop clock logic includes an AND gate that receives a signal asserted by the bus bridge device to stop the CPU clock signal and receives a signal from the CPU module indicative of an ongoing Geyserville mode switch.

18. The computer system of claim 16 wherein the bus bridge device asserts an SMI when the general purpose input signal is asserted by the CPU module to initiate a break event.

19. The computer system of claim 16 wherein the CPU module enables a trap for the general purpose input signal used to initiate the break event.

20. The computer system of claim 16 wherein the CPU module disables I/O and memory monitoring cycles associated with the general purpose input signal.

21. The computer system of claim 17 further including a clock generator disposed between said stop clock logic and said CPU module, that generates a periodic signal that is provided to the CPU module for generating the CPU clock signal, and said stop clock logic asserts the stop clock control signal provided to said clock generator when the signal from the bus bridge and the signal from the CPU module are asserted concurrently.

* * * * *